United States Patent
Kuboki

(10) Patent No.: US 11,146,337 B2
(45) Date of Patent: Oct. 12, 2021

(54) OPTICAL TRANSCEIVER DEVICE, OPTICAL MODULATOR CONTROL METHOD, AND NON-TRANSITORY COMPUTER READABLE MEDIUM STORING OPTICAL MODULATOR CONTROL PROGRAM

(71) Applicant: NEC Corporation, Tokyo (JP)

(72) Inventor: Shingo Kuboki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/977,960

(22) PCT Filed: Nov. 27, 2018

(86) PCT No.: PCT/JP2018/043469
§ 371 (c)(1),
(2) Date: Sep. 3, 2020

(87) PCT Pub. No.: WO2019/187335
PCT Pub. Date: Oct. 3, 2019

(65) Prior Publication Data
US 2021/0013970 A1 Jan. 14, 2021

(30) Foreign Application Priority Data
Mar. 30, 2018 (JP) .............................. JP2018-066640

(51) Int. Cl.
*H04B 10/04* (2006.01)
*H04B 10/12* (2006.01)
(Continued)

(52) U.S. Cl.
CPC ........... *H04B 10/516* (2013.01); *H04B 10/40* (2013.01)

(58) Field of Classification Search
CPC .............................. H04B 10/516; H04B 10/40
See application file for complete search history.

(56) References Cited

U.S. PATENT DOCUMENTS

2005/0190428 A1* 9/2005 Gronbach ............. G02F 1/0123
359/245
2006/0127103 A1* 6/2006 Mazurczyk ........ H04B 10/5051
398/188
2011/0164300 A1* 7/2011 Shen ..................... G02F 1/0327
359/238

FOREIGN PATENT DOCUMENTS

EP  1986353 A1  10/2008
EP  2339315 A1   6/2011
(Continued)

OTHER PUBLICATIONS

International Search Report corresponding to PCT/JP2018/043469, 2 pages, dated Jan. 8, 2019.

*Primary Examiner* — Pranesh K Barua

(57) ABSTRACT

A feedback proportional control repeats the following processing of starting control of an optical modulator by a control signal that corresponds to a reference value set in the preliminary search or in the previous cycle, calculating a new reference value based on an error signal obtained from the optical modulator, and controlling the optical modulator by the control signal that corresponds to the new reference value, thereby acquiring the control signal in which the error signal is minimized as an optimal control signal, setting the acquired control signal as a signal for controlling the optical modulator, and storing the optimal control signal as the reference value to be used at a time of starting the feedback proportional control in the next cycle.

8 Claims, 8 Drawing Sheets

(51) Int. Cl.
*H04B 10/516* (2013.01)
*H04B 10/40* (2013.01)

(56) References Cited

FOREIGN PATENT DOCUMENTS

| | | | |
|---|---|---|---|
| EP | 3026832 | A1 | 6/2016 |
| JP | 2000-162563 | A | 6/2000 |
| JP | 2008-292985 | A | 12/2008 |
| JP | 2012-257164 | A | 12/2012 |
| JP | 2016-102870 | A | 6/2016 |

\* cited by examiner

OPTICAL TRANSCEIVER DEVICE, OPTICAL MODULATOR CONTROL METHOD, AND NON-TRANSITORY COMPUTER READABLE MEDIUM STORING OPTICAL MODULATOR CONTROL PROGRAM

CROSS-REFERENCE TO RELATED APPLICATIONS

This application is a national stage application of International Application No. PCT/JP2018/043469 entitled "OPTICAL TRANSCEIVER DEVICE, OPTICAL MODULATOR CONTROL METHOD, AND NON-TRANSITORY COMPUTER READABLE MEDIUM STORING OPTICAL MODULATOR CONTROL PROGRAM," filed on Nov. 27, 2018, which claims the benefit of the priority of Japanese Patent Application No. 2018-066640 filed on Mar. 30, 2018, the disclosures of each of which are hereby incorporated by reference in their entirety.

TECHNICAL FIELD

The present disclosure relates to an optical transceiver device, an optical modulator control method, and an optical modulator control program. In particular, the present disclosure relates to an optical transceiver device, an optical modulator control method, and an optical modulator control program that can be suitably applied, for example, to equipment with large capacity, high speed, and high performance such as 600 G/1.2 T TRANSPONDER digital coherent module in commercial optical networks managed by communication providers.

BACKGROUND ART

In optical communication networks, optical intensity modulation in which a continuous (CW: Continuous Wave) light is modulated by a data signal and the intensity of the light is changed by turning on or off the continuous light has been typically used. In high-speed transmission in which the bit rate is 10 Gbps or larger, a Mach-Zehnder type optical modulator called an external modulator is widely used as an optical modulator. The technique of this Mach-Zehnder type optical modulator is disclosed in Patent Literature 1: Japanese Unexamined Patent Application Publication No. 2000-162563, titled "Optical modulation apparatus and method of controlling optical modulator" etc. As disclosed in Patent Literature 1 as well, in the Mach-Zehnder type optical modulator, a change in the temperature of LiNbO3 (lithium niobate: abbreviated as LN) constituting a substrate, prolonged application of an electric field thereto, and aging thereof are accompanied by polarization of the substrate, which causes a bias voltage for control to be fluctuated.

Therefore, in order to stabilize the operation point of the optical modulator, it is required to keep performing feedback control at short time intervals of an order of a millimeter. That is, it is required to repeatedly execute the feedback control of extracting, from a modulated optical signal output from the optical modulator in accordance with a control signal that controls a drive bias voltage to be applied to the optical modulator, an error signal that corresponds to the control signal included in the modulated optical signal by a calculation, and changing the control signal to a new value so as to cancel the error signal, thereby outputting the new value to the optical modulator. In the current technique, however, there is a problem to be solved that it requires a long period of time to perform the feedback control regarding an optical transceiver device on which the aforementioned optical modulator is mounted.

The causes of the prolonged time required for the feedback control in the optical transceiver device according to the current technique are as follows. One of the causes is due to the need to perform an operation of dividing the error signals calculated by a hardware circuit or a processor into four ranges depending on the sizes of the error signals and repeating the operation of sequentially applying the voltages of the control signals while changing the voltages at different step sizes in each of the four ranges, thereby obtaining the optimal control signal in which a value of the error signal is small. Another cause is that the value of the first control signal when the feedback control is started has to be set to a reference value fixed each time.

When the error signals are divided into four ranges depending on the sizes of the error signals and the voltages of the control signals are sequentially applied while changing the voltages at different step sizes in each of the four ranges, the four ranges and the step sizes of the control signals may be specifically set, for example, as follows.

(1) First Range

When the error signal has a size of 0-10 mV, the control signal to be applied is changed in units of 1 mV.

(2) Second Range

When the error signal has a size of 11-100 mV, the control signal to be applied is changed in units of 3 mV.

(3) Third Range

When the error signal has a size of 101-500 mV, the control signal to be applied is changed in units of 10 mV.

(4) Fourth Range

When the error signal has a size of 501-2500 mV, the control signal to be applied is changed in units of 20 mV.

FIG. 8, which is an explanatory diagram for describing an operation of setting the control signals in the current technique, shows a state in which the error signals are divided into the aforementioned four ranges depending on their sizes and the step size of the control signals to be applied is changed using black dots on a graph. As shown in FIG. 8, when the operation is started from a control signal $A_1$ indicated as control start in the fourth range (a position that is constantly fixed as a reference value), the voltage of the control signal is sequentially increased in a step of 20 mV until a control signal $A_2$, which is the last signal of the fourth range. In a control signal $B_1$ in the third range, the width of the step is changed from 20 mV to 10 mV, and after that the voltages of the control signals are sequentially increased until a control signal $B_2$, which is the last signal of the third range.

Further, in a control signal $C_1$ in the second range, the width of the step is changed from 10 mV to 3 mV, and after that the voltages of the control signals are sequentially increased until a control signal $C_2$, which is the last part of the second range. Then, in a control signal $D_1$ in the first range, the width of the step is changed from 3 mV to 1 mV, and after that the voltages of the control signals are sequentially increased until a control signal $D_2$ in which the minimum value of the error signal is detected in the first range.

As described above, regarding the control signals where the control is always started from the position fixed as the reference value, a procedure in which the step size between the control signals is increased when the error signals are large and the feedback operation is repeated and the step between the control signals is decreased as the error signals become smaller to allow the control signals to converge to the optimal control signal is used. Accordingly, it is required to repeatedly execute the feedback control operation a number of times until the optimal control signal in which the error signal is a minimum is obtained, which is disadvantageous as regards increasing the speed. Further, since the step size of the change in the control signals is a fixed value in each of the four ranges, it is difficult to increase the precision level.

CITATION LIST

Patent Literature

[Patent Literature 1] Japanese Unexamined Patent Application Publication No. 2000-162563

SUMMARY OF INVENTION

Technical Problem

As described above, in the current technique, it takes a long period time to perform feedback control of the optical modulator and the control itself is a coarse control, which is insufficient from the viewpoint of increasing the speed and precision of the control of the optical modulator. There is thus a problem to be solved regarding how to increase the speed and the level of precision of control of the optical modulator.

Object of Present Disclosure

The present disclosure has been made in view of the aforementioned circumstances and an object of the present disclosure is to provide an optical transceiver device, an optical modulator control method, and an optical modulator control program capable of reducing the time of controlling the optical modulator.

Solution to Problem

In order to solve the aforementioned problems, an optical transceiver device, an optical modulator control method, and an optical modulator control program according to the present disclosure mainly employ the following characteristic configurations.

(1) An optical transceiver device according to the present disclosure includes:
an optical modulator that modulates a continuous light from a light source, controls a bias voltage of the optical modulator by a control signal, and periodically updates the control signal at predetermined cycles;
a function of setting the control signal at two stages including a preliminary search executed only at a time of initial startup and a feedback proportional control periodically executed for each cycle;
a function of setting, in the preliminary search, the control signal used at a time of starting the feedback proportional control subsequently executed as a reference value; and
functions of repeating, in the feedback proportional control, the following processing of starting control of the optical modulator by a control signal that corresponds to the reference value set in the preliminary search or a reference value stored in the feedback proportional control in the previous cycle, calculating a new reference value based on an error signal obtained from the optical modulator as a result of controlling the optical modulator, and controlling the optical modulator by the control signal that corresponds to the calculated new reference value, thereby acquiring the control signal in which the error signal is minimized as the optimal control signal and setting the acquired control signal as a signal for controlling the optical modulator, and storing the set optimal control signal as a reference value to be used at a time of starting the feedback proportional control in the next cycle.

(2) An optical modulator control method according to the present disclosure includes:
controlling a bias voltage of an optical modulator that modulates a continuous light from a light source by a control signal and periodically updating the control signal at predetermined cycles;
a step of setting the control signal at two stages including a preliminary search executed only at a time of initial startup and a feedback proportional control periodically executed for each cycle;
a step of setting the control signal used at a time of starting the feedback proportional control subsequently executed as a reference value in the preliminary search; and
a step of repeating, in the feedback proportional control, the following processing of starting control of the optical modulator by a control signal that corresponds to the reference value set in the preliminary search or a reference value stored in the feedback proportional control in the previous cycle, calculating a new reference value based on an error signal obtained from the optical modulator as a result of controlling the optical modulator, and controlling the optical modulator by a control signal that corresponds to the calculated new reference value, thereby acquiring the control signal in which the error signal is minimized as the optimal control signal and setting the acquired control signal as a signal for controlling the optical modulator, and storing the set optimal control signal as a reference value to be used at a time of starting the feedback proportional control in the next cycle.

(3) An optical modulator control program according to the present disclosure executes, by a computer, the processing of controlling a bias voltage of an optical modulator that modulates a continuous light from a light source by a control signal and periodically updating the control signal at predetermined cycles, the optical modulator control program comprising the following processing of:
setting the control signal at two stages including a preliminary search executed only at a time of initial startup and a feedback proportional control periodically executed for each cycle;
setting the control signal used at a time of the feedback proportional control subsequently executed as a reference value in the preliminary search; and
repeating, in the feedback proportional control, the following processing of starting control of the optical modulator by a control signal that corresponds to the reference value set in the preliminary search or a reference value stored in the feedback proportional control in the previous cycle, calculating a new reference value based on an error signal obtained from the optical modulator as a result of controlling the optical modulator, and controlling the optical modulator by a control signal that corresponds to the calculated new reference value, thereby acquiring the control signal in which the error signal is minimized as the optimal control signal and setting the acquired control signal as a signal for controlling the optical modulator, and storing the set optimal control signal as a reference value to be used at a time of starting the feedback proportional control in the next cycle.

ADVANTAGEOUS EFFECTS OF INVENTION

According to the optical transceiver device, the optical modulator control method, and the optical modulator control program of the present disclosure, the following effects may be mainly obtained.

The operation executed only the first time is separated as the "preliminary search" and the first control signal in each feedback proportional control periodically executed can be started from a neighboring value in which the minimum value of the error signal can be obtained at that time, whereby it is possible to reduce the time of controlling the optical modulator and the time of starting up the optical transceiver device 10 on which the optical modulator is mounted. Further, fine control signals are generated using the correction values calculated based on the error signals in each feedback proportional control, whereby it becomes possible to control the optical modulator 12 with a high accuracy, improve the signal quality, and achieve multi-level modulation such as 64 QAM.

DESCRIPTION OF EMBODIMENTS

Figure 1:
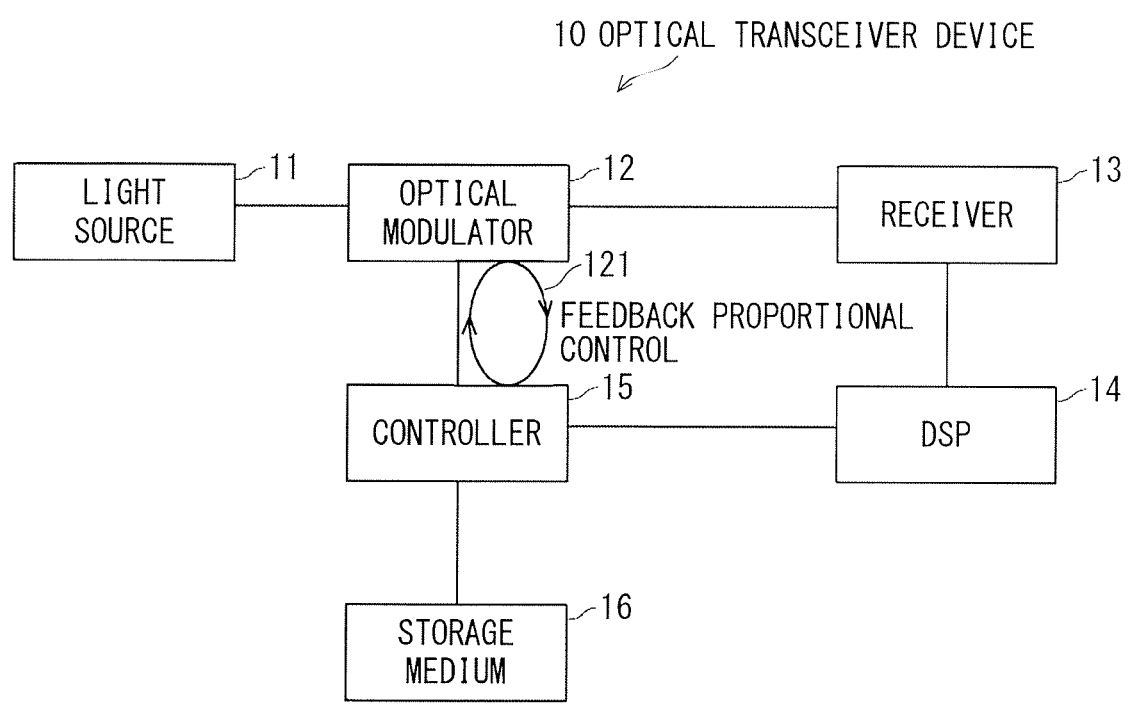
FIG. 1 is a block configuration diagram showing one example of an internal configuration of an optical transceiver device according to the present disclosure.

In the following description, with reference to the accompanying drawings, a preferable example embodiment of an optical transceiver device, an optical modulator control method, and an optical modulator control program according to the present disclosure will be described. While the optical transceiver device and the optical modulator control method according to the present disclosure will be described in the following description, it is needless to say that this optical modulator control method may be executed as an optical modulator control program that can be executed by a computer or the optical modulator control program may be stored in a storage medium that can be read out by a computer. Further, it is needless to say that the reference symbols attached to the following drawings are added to the respective elements for the sake of convenience as one example for facilitating understanding, and are not intended to limit the present disclosure to the illustrated aspects.

Feature of Present Disclosure

Prior to giving the description of an example embodiment of the present disclosure, an outline of a feature of the present disclosure will be described first. The main feature of the present disclosure is that it includes a two-stage control function including a "preliminary search" for acquiring a neighboring control signal in which a minimum error signal is obtained by a coarse search at a time of initial startup of an optical modulator and a "feedback proportional control" in which an operation is started from a neighboring control signal in which the minimum error signal is obtained each time for each predetermined cycle and the optical modulator is controlled by a new control signal corrected based on the obtained error signal. In the "feedback proportional control", the above operations are repeated, thereby setting an optimal control signal in which the error signal is minimized.

More specifically, according to the present disclosure, a range in which it is assumed that the error signal may become a minimum value regarding control signals for bias voltage control is coarsely searched at a time of the initial startup of the optical modulator as a "preliminary search", and one of the control signals in which the error signal is minimized is determined in advance as a "reference value" for the first feedback proportional control subsequently executed. Then, in the "feedback proportional control" periodically executed for each predetermined cycle, the optical modulator is controlled first by the control signal of the "reference value" determined in the "preliminary search" or the feedback proportional control in the previous cycle, and then a new "reference value" corrected by a correction value calculated based on the obtained error signal is sequentially generated, and the optical modulator is controlled by the control signal that corresponds to the generated new "reference value". The above operations are repeated, thereby acquiring the control signal in which the minimum error signal has been obtained as the optimal control signal, which is set as a signal for controlling the optical modulator. After that, this set optimal control signal is stored as a reference value that is used at the time of starting the feedback proportional control in the next cycle. The main feature of the present disclosure is to perform the above operations.

Accordingly, it is possible to reduce the time of controlling the optical modulator and the time of starting up the transceiver device, and enable control of the optical modulator by the optimal bias voltage, thereby obtaining the optical modulator with a high accuracy. The optical modulator targeted by the present disclosure mainly indicates an optical modulator that uses ferroelectric crystal such as an LN (an abbreviation for LiNbO3: lithium niobate) modulator.

In summary, one feature of the present disclosure is to perform a two-stage control regarding control of the drive bias voltage of the optical modulator, as described below.

(1) The first stage is "preliminary search" performed immediately after a start of initial control of the optical modulator. The "preliminary search", which is a procedure executed at the time of initial control of the optical modulator, coarsely searches a range in which it is assumed that the error signal may become a minimum value in advance, and determines the control signal in which the error signal has a minimum value (a signal that controls the drive bias voltage for the optical modulator) as a "reference value" as a result of the search. The present disclosure has a function of causing the "feedback proportional control" subsequently executed to be started from the "reference value" determined in the "preliminary search" (i.e., a control signal in the vicinity of the optimal control signal in which the minimum value of the error signal can be obtained at that time), not from one reference value that has been fixed and set in advance.

(2) The second stage, which is executed following the preliminary search, is "feedback proportional control" periodically executed after the preliminary search at predetermined cycles. The "feedback proportional control" here is executed following the "preliminary search" at the time of initial control of the optical modulator. The "feedback proportional control" starts from an operation of controlling the optical modulator using the control signal that corresponds to the "reference value" determined in the "preliminary search" as a drive bias voltage and performs control so as to acquire the optimal control signal in which the error signal is minimized. Then, in the second and subsequent cycles, an operation of controlling the optical modulator using a control signal that corresponds to the "reference value" set as the optimal control signal in the "feedback proportional control" executed last time as a drive bias voltage is immediately started without executing the "preliminary search" in advance and control is performed so as to acquire the optimal control signal in which the error signal is minimized.

In each "feedback proportional control", first, an operation of obtaining the error signal by the control signal that corresponds to the "reference value" in the "preliminary search" or in the "feedback proportional control" in the previous cycle (control signal in which it is determined that the error signal has become minimized at each time point) is started, and the value of the obtained error signal is multiplied by a constant $\beta$ predetermined as a value for adjusting the control sensitivity (control step), to obtain a correction value $\alpha$. After that, in such a way that the control signal in the direction where the error signal approaches '0' can be obtained after the correction, a correction is made to the "reference value" using the obtained correction value $\alpha$ (e.g., by adding or subtracting the correction value $\alpha$ to or from the "reference value") to calculate a new "reference value", and the optical modulator is controlled using the control signal that corresponds to the calculated new "reference value" as the drive bias voltage. The above operations are repeated. By repeating the above operations, the control signal in which the error signal is minimized is acquired as the optimal control signal and set as a signal for controlling the optical modulator, and this set optimal control signal is stored to be used at the time of starting the "feedback proportional control" in the next cycle as the "reference value" (i.e., the control signal). The present disclosure includes the aforementioned function.

That is, the control according to the present disclosure as compared to that of the current technique is as shown in the following Table 1. According to the "feedback proportional control" in the second stage periodically executed in the present disclosure, it is possible to shorten the time of controlling the optical modulator and to operate the optical modulator more accurately and more stably than in the proportional control in the current technique.

TABLE 1

| | Control of present disclosure | Current control |
|---|---|---|
| Control signal | Reference value ± $\alpha$ | Previous value ± $\alpha'$ |
| $\alpha, \alpha'$ | $\alpha = $ Error signal value × Constant $\beta$ | $\alpha' = $ Constant (four-value proportional control) |
| Preliminary search | Yes | No |

As shown in Table 1, in the current optical modulator, as a control signal for feedback control of the optical modulator periodically executed, the "preliminary search" is not performed, and an operation of "previous value±correction value $\alpha'$" ($\alpha'$: proportional control by four values based on the sizes of the error signals) is repeated, starting from the reference value that is constantly fixed for each cycle. Therefore, as described above in Background Art, it is impossible to prevent the control time until the appropriate control signal is obtained from being increased.

On the other hand, in the present disclosure, the "preliminary search" at the first stage is executed only the first time, and in the "feedback proportional control" at the second stage periodically executed at each cycle, the optimal control signal acquired in the "preliminary search" or the "feedback proportional control" in the previous cycle is used as a new "reference value", and an operation of acquiring the optimal control signal at that time, starting from the new "reference value", is performed each time.

That is, in the present disclosure, as the control signal for feedback proportional control, the control signal that corresponds to the error signal having the smallest value coarsely searched in the "preliminary search" is set as an initial reference value, and after that feedback proportional control in which a new reference value in accordance with the value of the error signal is finely set is executed by "reference value±correction value $\alpha$" ($\alpha$=error signal value×constant $\beta$, constant $\beta$: a numerical value predetermined as a value for adjusting control sensitivity (control step)), whereby the optimal control signal is determined.

Therefore, in the following process, in the second stage periodically executed, the operation starts from a neighboring control signal in which the minimum error signal can be obtained, and the reference value can be finely set, whereby it is possible to obtain an optimal control signal whose accuracy is higher than that in the current technique and to significantly reduce the time of controlling the optical modulator compared to that in the current technique.

The control signal that is being used is a signal for control voltage for the bias drive circuit that performs an operation of applying a drive bias voltage to a bias control terminal of the optical modulator, and in an indirect sense, it means a voltage value that can be regarded as a bias voltage for the optical modulator. Further, the error signal means data which indicates the amplitude of a low-frequency signal (this signal is also referred to as a dither signal or a pilot signal) added for the bias control of the optical modulator by a numerical value.

Embodiments of Present Disclosure

Next, the example embodiment of the present disclosure will be described in detail. In the example embodiment, an LN modulator is used as a target optical modulator. Further, regarding the control signal to be used for the bias control of the LN modulator, the operation starts from setting of a value (reference value) in which the error signal has been minimized in the "preliminary search", and an operation of setting, as a new reference value, a value obtained by adding or subtracting the correction value α that has been calculated based on the error signals sequentially obtained to or from the reference value is repeated. Note that the error signals are generated by, for example, calculation performed by a hardware circuit and a processor (a Digital Signal Processor (DSP)) and the correction value α is obtained by multiplying the error signal by a constant β (a value determined in advance based on the sample value as a numerical value for adjusting control sensitivity (control step)) using, for example, a processor. It is assumed that an optical transceiver device that performs multi-level modulation such as 64 QAM or 32 QAM is used as the optical transceiver device according to the example embodiment.

Configuration Example of Example Embodiment of Present Disclosure

First, with reference to FIG. 1, one example of an internal configuration of an optical transceiver device according to the present disclosure will be described. FIG. 1 is a block configuration diagram showing one example of the internal configuration of the optical transceiver device according to the present disclosure. An optical transceiver device 10 shown in FIG. 1 is configured to include at least a light source 11, an optical modulator 12, a receiver 13, a DSP 14, a controller 15, and a storage medium 16.

The light source 11, which is, for example, a light source for a small transponder used for digital coherent optical communication such as ITLA (Integrable Tunable Laser Assembly: variable wavelength laser light source), includes a function of outputting a continuous (CW: Continuous Wave) light, and outputs the CW light to the optical modulator 12. The optical modulator 12, which is an LN modulator, includes a function of phase-modulating the CW light input from the light source 11 by voltage control from the controller 15 and outputting the modulated optical signal as a modulated optical signal.

The controller 15, which includes a function of a control driver for the optical modulator 12, executes various kinds of processing on an electric signal output from the DSP 14, generates a control signal, adjusts the waveform of the generated control signal, and outputs the obtained signal to the optical modulator 12 as a control driver signal to be used for bias voltage control of the optical modulator 12. Then the controller 15 controls the optical modulator 12 by a feedback proportional control 121 that performs the feedback operation via the optical modulator 12→the receiver 13→and the DSP 14, as shown by the loop-form arrow line in FIG. 1.

Now, in this example embodiment, the controller 15 includes a processor and this processor receives and outputs data from or to the storage medium 16, thereby detecting the error signal indicated by the electric signal output from the DSP 14 (data indicating the amplitude of the low-frequency signal added for the bias control of the optical modulator 12). Further, the detected error signal is stored in the storage medium 16 in association with the control signal, and at the same time it is checked whether or not the detected error signal has become '0' or has been increased from the previous value in order to determine whether or not the error signal has reached the minimum value.

Further, when the detected error signal is other than '0' and is a value decreased from the previous value, the processor of the controller 15 multiplies the detected error signal by a constant β predetermined as a numerical value for adjusting the control sensitivity (control step) to obtain a correction value α with respect to the reference value. Then the obtained correction value α is added to or subtracted from the reference value obtained as a result of the preliminary search or the reference value calculated in the previous feedback proportional control 121, thereby generating a new control signal. Then the control signal that has been newly generated is stored in the storage medium 16 as the next reference value of the feedback proportional control 121.

The receiver 13 converts the optical signal modulated by and output from the optical modulator 12, that is, the modulated optical signal, into an electric signal and outputs the electric signal to the DSP 14. The DSP 14, which is a digital signal processor that performs various kinds of data processing in collaboration with a hardware circuit, has functions of performing various kinds of processing on the electric signal received from the receiver 13, generating an error signal which indicates the amplitude of a low-frequency signal (this signal is also referred to as a dither signal or a pilot signal) added for the bias control of the optical modulator 12 by a numerical value, and outputting the generated error signal to the controller 15.

Figure 2:
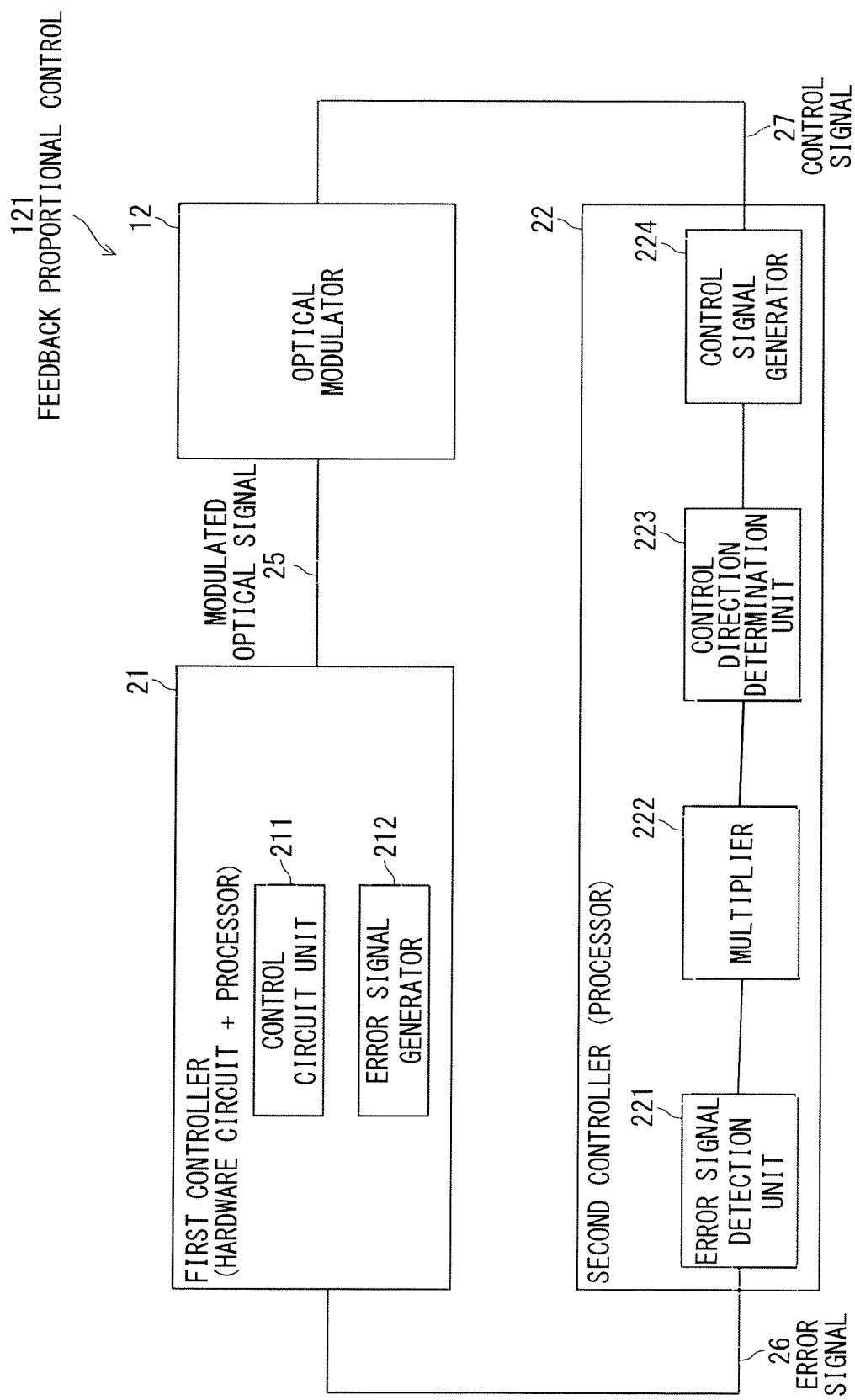
FIG. 2 is an explanatory diagram for describing one example of an operation of a feedback proportional control in the optical transceiver device shown in FIG. 1.

Next, with reference to FIG. 2, an operation of the feedback proportional control 121 shown by the arrow line in FIG. 1 will be further described. FIG. 2 is an explanatory diagram for describing one example of the operation of the feedback proportional control 121 in the optical transceiver device 10 shown in FIG. 1. The function allocation between the DSP 14 and the controller 15 shown in FIG. 1 merely shows one example and it is not limited to the function allocation described above in the description of FIG. 1 and a desired function allocation may be performed as long as a series of operations regarding the feedback proportional control 121 can be executed more rapidly and more accurately. For example, the DSP 14 may further include a function other than generation of the error signal such as a function of calculating the correction value α.

With regard to the above description, FIG. 2 expresses a controller having functions of converting the modulated optical signal 25 output from the optical modulator 12 into an electric signal and outputting an error signal 26 (hardware circuit+processor: the DSP 14 in FIG. 1) as a first controller 21 and a controller having functions of generating a new control signal 27 from the error signal 26 input from the first controller 21 and outputting the new control signal 27 to the optical modulator 12 (processor: the controller 15 in FIG. 1) as a second controller 22.

The first controller 21 includes therein a control circuit unit 211, which corresponds to a hardware circuit, that extracts the error signal component included in the modulated optical signal 25 output from the optical modulator 12 via the receiver 13 and converts the error signal into an electric signal having a form of a digital signal and an error signal generator 212 that generates the error signal 26 in collaboration with the control circuit unit 211.

Further, the second controller 22 includes therein an error signal detection unit 221 that detects the error signal 26 from the first controller 21, a multiplier 222 that multiplies the error signal 26 detected by the error signal detection unit 221 by the constant β predetermined as a numerical value for adjusting the control sensitivity (control step) and generates the correction value α, a control direction determination unit 223 that determines the control direction with respect to the reference value of the correction value α generated by the multiplier 222, and a control signal generator 224 that makes a correction to the reference value by the correction value α toward the direction determined in the control direction determination unit 223 to generate a new reference value and outputs a control signal 27 that corresponds to the generated reference value to the optical modulator 12.

As shown in FIG. 2, first, when the control signal 27 is output from the control signal generator 224 in the second controller 22 to the optical modulator 12, the optical modulator 12 outputs the modulated optical signal 25 obtained by modulating the continuous light (CW light) input from the light source 11 in accordance with the control signal 27 to the receiver 13 not shown in FIG. 2 from an optical monitor output terminal. The receiver 13 converts the modulated optical signal 25 into an electric signal and outputs the obtained signal to the first controller 21. Upon receiving the modulated optical signal 25 converted into the electric signal from the receiver 13, the first controller 21 extracts the error signal component included in the modulated optical signal 25 by the control circuit unit 211 in collaboration with the error signal generator 212, converts the extracted error signal component into a digital signal to generate the error signal 26, and outputs the error signal 26 to the second controller 22.

First, when the error signal detection unit 221 has detected the error signal 26 from the first controller 21, the second controller 22 stores the detected error signal 26 in the storage medium 16 in association with the control signal 27 at that time, and further checks whether the error signal 26 is '0' or is a value increased from the previous value. When the error signal is '0' or increased from the previous value, it is determined that the minimum value of the error signal in the feedback proportional control 121 this time has been detected and the optimal control signal for controlling the optical modulator 12 has been detected. In this case, the operation moves to ending of the operation of the feedback proportional control 121 at the present cycle. That is, when the detected error signal corresponds to the control signal 27 that corresponds to the error signal '0' or is a value increased from the previous value, the control signal 27 that corresponds to the previous error signal is set as an optimal control signal in the feedback proportional control 121 this time and stores the control signal 27 that corresponds to the previous error signal in the storage medium 16 as a reference value indicating the control signal used at the time of starting the feedback proportional control 121 in the next cycle.

Further, when the detected error signal 26 is other than '0' and has been decreased to a value smaller than the previous value, this means a state in which the minimum value of the error signal has not yet been detected. In this case, the error signal detection unit 221 outputs this error signal 26 to the multiplier 222. The multiplier 222 multiplies the error signal 26 by the predetermined constant β to generate the correction value α, and outputs the correction value α to the control direction determination unit 223. The control direction determination unit 223 determines the direction in which the correction is made to the reference value (that is, whether to add or subtract the correction value α) and outputs the result of the determination, which is the determined direction indicating the control direction, to the control signal generator 224. The control signal generator 224 corrects the reference value that has been set so far based on the correction value α generated by the multiplier 222 and the control direction determined in the control direction determination unit 223 (in this example embodiment, adds or subtracts the correction value α to or from the reference value) to generate a new reference value. Then the control signal generator 224 stores the generated new reference value in the storage medium 16 as information indicating the new control signal, generates a control signal that corresponds to the generated new reference value, and outputs the generated control signal to the optical modulator 12.

The aforementioned operation is one loop operation of the feedback proportional control 121. This loop operation is repeated until the error signal 26 output from the first controller 21 becomes "0" or the minimum value is detected in the error signal detection unit 221 in the second controller 22 within the range in which the error signal may be minimized. The phrase "within the range in which the error signal may be minimized" means a range predetermined as a target range for performing the "preliminary search". That is, the above range is set in order to prevent the operation of the feedback proportional control 121 from continuing endlessly in a case in which the error signal 26 indicating "0" or having the minimum value cannot be detected in the error signal detection unit 221 in the second controller 22.

Description of Operations of Example Embodiment of the Present Disclosure

Next, one example of the operation of the optical transceiver device 10 shown in FIG. 1 will be described in detail, focusing on an operation of controlling the optical modulator 12. The above control regarding the optical modulator 12, which is periodically executed at predetermined cycles, is executed by a hardware circuit and a processor in this example embodiment. Regarding the control part by the processor, it can be executed as a program (i.e., an optical modulator control program) executed in the processor (the DSP 14 and the controller 15 shown in FIG. 1) mounted on the optical transceiver device 10. It is needless to say that the operation regarding the control part by the processor is not limited to the case in which the operation is executed as a program by a processor like in this example embodiment and may be executed by firmware or hardware without using the processor.

Figure 3:
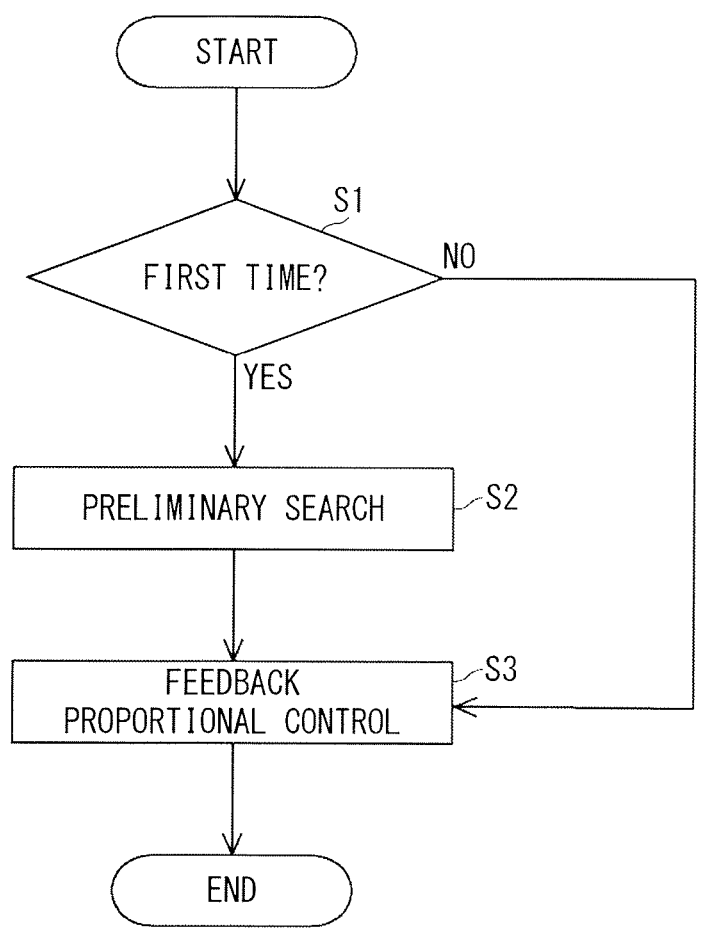
FIG. 3 is a flowchart showing one example of an outline of a control operation on an optical modulator of the optical transceiver device shown in FIG. 1.

First, with reference to the flowchart shown in FIG. 3, the outline of the control operation on the optical modulator 12 of the optical transceiver device 10 will be described. FIG. 3 is a flowchart showing one example of the outline of the control operation on the optical modulator 12 of the optical transceiver device 10 shown in FIG. 1 and is periodically started at predetermined cycles.

When the flowchart shown in FIG. 3 is started at a predetermined cycle, it is checked whether the control to be performed is an initial control of the optical modulator 12 (Step S1). When it is the initial control (YES in Step S1), first, the operation of the 'preliminary search' is executed (Step S2), and after that the operation of the 'feedback proportional control' is executed (Step S3). On the other hand, when the control to be performed is not the initial control and the operation of the 'preliminary search' has already been executed (NO in Step S1), the process immediately proceeds to Step S3, where the operation of the 'feedback proportional control' is executed (Step S3). By performing the operation of Step S3, the feedback proportional control 121 shown in FIG. 2 is executed.

While one feedback proportional control is executed by the aforementioned operation, the operation of the flowchart shown in FIG. 3 is repeated at each predetermined cycle, whereby the loop operation of the feedback proportional control 121 shown in FIG. 2 is repeatedly executed periodically as a feedback proportional control loop.

Figure 4:
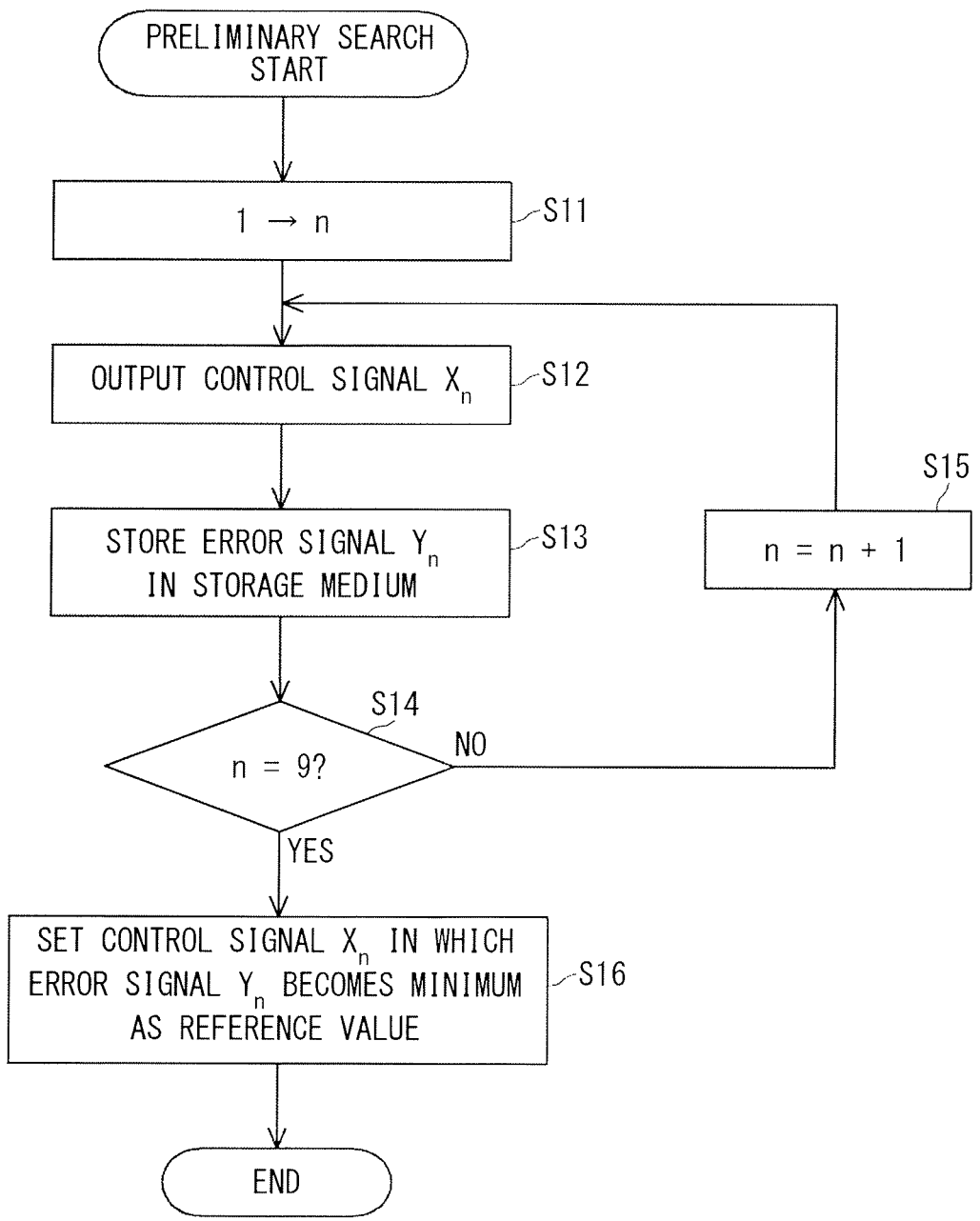
FIG. 4 is a flowchart showing one example of detailed operations regarding a preliminary search shown in Step S2 in the flowchart shown in FIG. 3.

Next, with reference to the flowchart shown in FIG. 4, details of the operation of the preliminary search in Step S2 in the flowchart shown in FIG. 3 will be described. FIG. 4 is a flowchart showing one example of detailed operations regarding the preliminary search in Step S2 in the flowchart shown in FIG. 3. While a case in which the "preliminary search" is executed nine times for a control signal $X_1$, a control signal $X_2$, . . . , and a control signal $X_9$ as control signals to be output to the optical modulator 12 is illustrated in the flowchart shown in FIG. 4, the number of times, namely, nine in the above case, is merely an example and it may be performed any number of times. Further, while a case in which a range where it is assumed that the error signal may become a minimum value is within a range of (−200 mV to +200 mV) regarding each of the voltage values of the control signals $X_1, X_2, \ldots, X_9$ and the voltage is set by step sizes at intervals of 50 mV, centering 0 mV, is illustrated in this example embodiment, it is needless to say that it is not limited to the above case.

In the flowchart shown in FIG. 4, first, in order to set the initial value of the control signal, '1' is set for a variable n (Step S11), and the control signal $X_n$ (initially, control signal $X_1$) is output to the optical modulator 12 (Step S12). When the modulated optical signal 25 modulated by the control signal $X_n$ is output from the optical modulator 12, the DSP 14 that has received the modulated optical signal 25 converted into the electric signal by the receiver 13 extracts an error signal from the modulated optical signal 25, and outputs the extracted error signal to the controller 15 as an error signal $Y_n$ (initially, an error signal $Y_1$). Therefore, the controller 15 stores the output error signal $Y_n$ (initially, the error signal $Y_1$) in the storage medium 16 shown in FIG. 1 in association with the control signal $X_n$ (initially, the control signal $X_1$) (Step S13). After that, it is checked whether the value of the variable n has reached '9', which is the last count (Step S14)

When the value of the variable n has not yet reached '9', which is the last count (NO in Step S14), '1' is added to the variable n (Step S15), the process goes back to Step S12, and the error signal $Y_n$ in the control signal $X_n$ in the next order is stored in the storage medium 16. The above operations are repeated. When the value of the variable n has reached '9', which is the last count (YES in Step S14), all the control signals $X_n$ and error signals $Y_n$ in the "preliminary search" are stored in the storage medium 16. In this case, the process proceeds to Step S16.

In Step S16, the error signal $Y_n$ in which the value is the minimum value is searched from among the error signals $Y_n$ stored in the storage medium 16 and the control signal $X_n$ in which the error signal $Y_n$ whose value is the minimum value can be obtained is set as a reference value indicating the value of the control signal that should be set first in the feedback proportional control subsequently executed (Step S16).

Next, one example of the results of storing the control signals $X_n$ and the error signals $Y_n$ in the storage medium 16 in the "preliminary search" is shown in the following Table 2.

TABLE 2

| Control signal $X_n$ [mV] | | Error signal $Y_n$ [mV] | |
|---|---|---|---|
| $X_1$ | 0 (Reference value) | $Y_1$ | 100 |
| $X_2$ | +50 | $Y_2$ | 80 |
| $X_3$ | −50 | $Y_3$ | 120 |
| $X_4$ | +100 | $Y_4$ | 55 |

TABLE 2-continued

| Control signal $X_n$ [mV] | | Error signal $Y_n$ [mV] | |
|---|---|---|---|
| $X_5$ | −100 | $Y_5$ | 140 |
| $X_6$ | +150 | $Y_6$ | 70 |
| $X_7$ | −150 | $Y_7$ | 160 |
| $X_8$ | +200 | $Y_8$ | 90 |
| $X_9$ | −200 | $Y_9$ | 190 |

Figure 5:
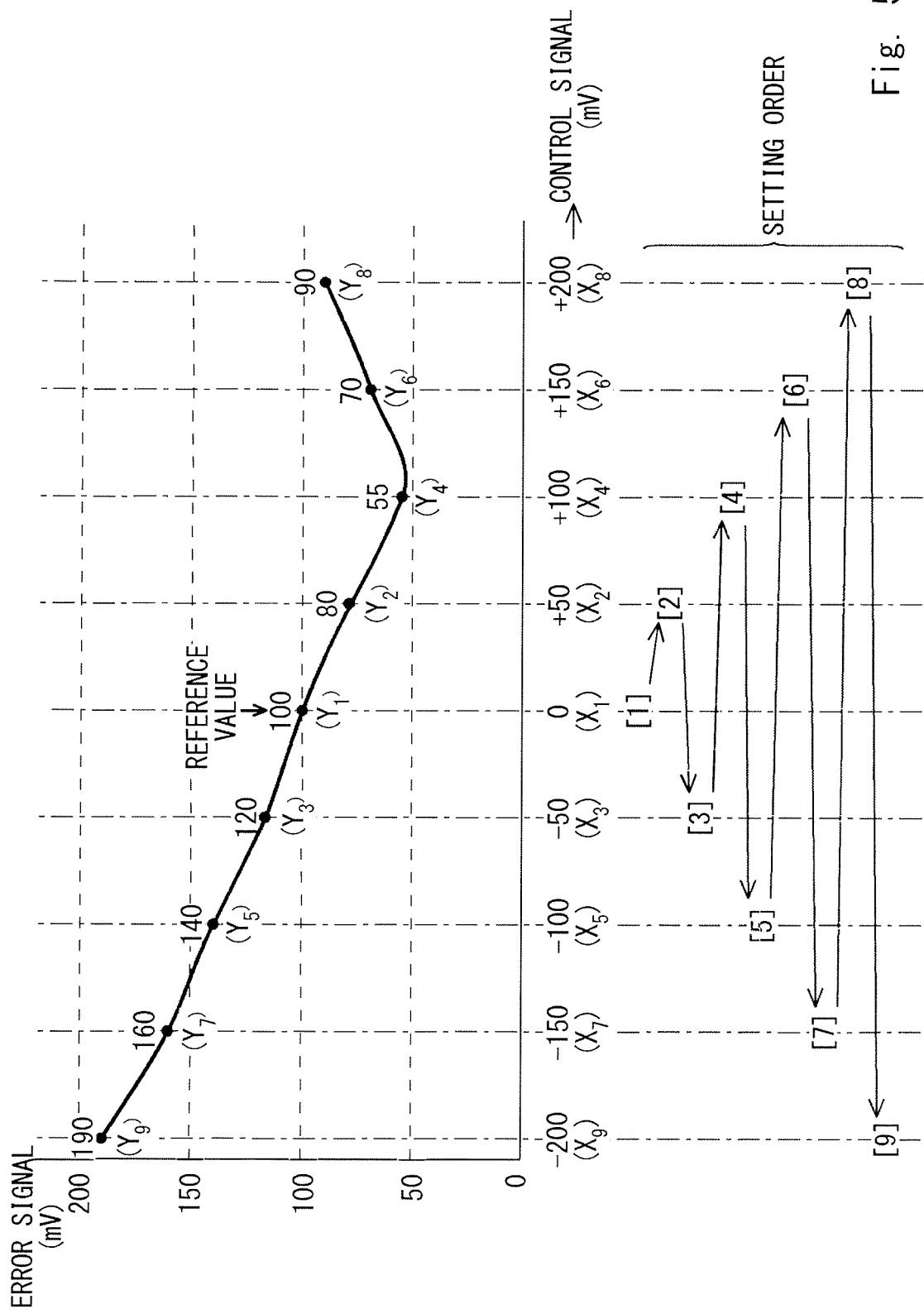
FIG. 5 is an explanatory diagram for describing one example of an order of setting control signals in the preliminary search shown in the flowchart in FIG. 4.

Regarding an order of setting the control signals X, in the "preliminary search" in the case of the example of the storage shown in Table 2, as described as "0 (reference value)" in the column of the control signal, the setting of the control signals Xn is started from the control signal $X_1$ that is determined as a fixed value in advance, and then the control signals are set in the order of $X_2 \rightarrow X_3 \rightarrow \ldots \rightarrow X_9$ within a range that is predetermined as a range in which it is assumed that the minimum value of the error signal can be obtained. FIG. 5 is an explanatory diagram for describing one example of the order of setting the control signals in the preliminary search in the flowchart in FIG. 4. As shown in FIG. 5 and Table 2, as described above, the nine control signals in the "preliminary search" are set to values obtained by dividing a range from −200 mV to +200 mV that is assumed in advance as a range in which it can be assumed that the minimum value of the error signal can be obtained in a step of 50 mV. Then, as shown in the setting order in FIG. 5, the control signals are set in the order of [1] 0 mV→[2] +50 mV→[3] −50 mV→[4] +100 mV→[5] −100 mV→ . . . , alternately switching the positive side and the negative side, starting from [1] 0 mV, which is the reference value. However, the order of setting the control signals Xn is not limited to the above one and may be any desired order.

In the case of the example of the storage shown in Table 2, the smallest value of the nine error signals Yn is '55 mV', which is the value of the error signal $Y_4$. Further, the control signal $X_4$ that corresponds to the error signal $Y_4$ is '+100 mV', as shown in the example of the storage in Table 2. Therefore, as a result of the coarse search of the "preliminary search", the control signal $X_4$ in which the smallest error signal $Y_4$ has been obtained, that is, '+100 mV', is determined as the "reference value" indicating the value of the control signal used at the first stage of the feedback proportional control subsequently executed. That is, the feedback proportional control subsequently executed is started not from the time point where the "preliminary search" shown as '0 mV (reference value)' in Table 2 is started but from a value in the vicinity of the value of the control signal in which a more accurate minimum value of the error signal at that time can be obtained. Therefore, it is possible to acquire the optimal control signal in a shorter time than in a case in which the feedback proportional control is started from the fixed value '0 mV' like in the related technique, whereby it is possible to reduce the time of controlling the optical modulator 12.

In this example embodiment, in the feedback proportional control subsequently executed, in order to prevent the operation of detecting the control signal that corresponds to the minimum value of the error signal from continuing endlessly, as described above, the feedback proportional control is executed only in the range predetermined as "the range where it is expected to obtain the minimum value of the error signal" in the "preliminary search". However, the range in which the feedback proportional control is executed may be set again based on the results of the "preliminary search".

For example, the range where it is expected to obtain the minimum value of the error signal in the feedback proportional control may be set again based on a "search range" which is a range of error signals that fall within a range of a predetermined threshold centering the minimum value of the error signal obtained in the "preliminary search". That is, when, for example, '±50 mV' has been set as the predetermined threshold, in the example of the storage shown in Table 2, a range (5 mV to 105 mV) that falls within the threshold '±50 mV', centering '55 mV' indicated by the minimum error signal $Y_4$ in the "preliminary search", is determined as the "search range" in the feedback proportional control. In each feedback proportional control executed after the execution of the "preliminary search", when an error signal exceeds the above "search range", the feedback proportional control is cancelled. In the following process, the minimum error signal is extracted from among the error signals collected in the previous feedback proportional control, and the control signal when the above error signal is obtained is determined as the optimal control signal at that time.

Further, the procedure of the operation of the "preliminary search" is not limited to the procedure shown in the flowchart in FIG. 4. The "preliminary search" is the operation limited at the time of initial startup and thus is not an operation periodically repeated. Accordingly, even when the execution time of the "preliminary search" is slightly increased, for example, the method aforementioned as the current technique, that is, the method of dividing error signals into four ranges depending on the sizes of the error signals and applying control voltages changed at different step sizes in each of the four ranges may be used as the "preliminary search".

Figure 6:
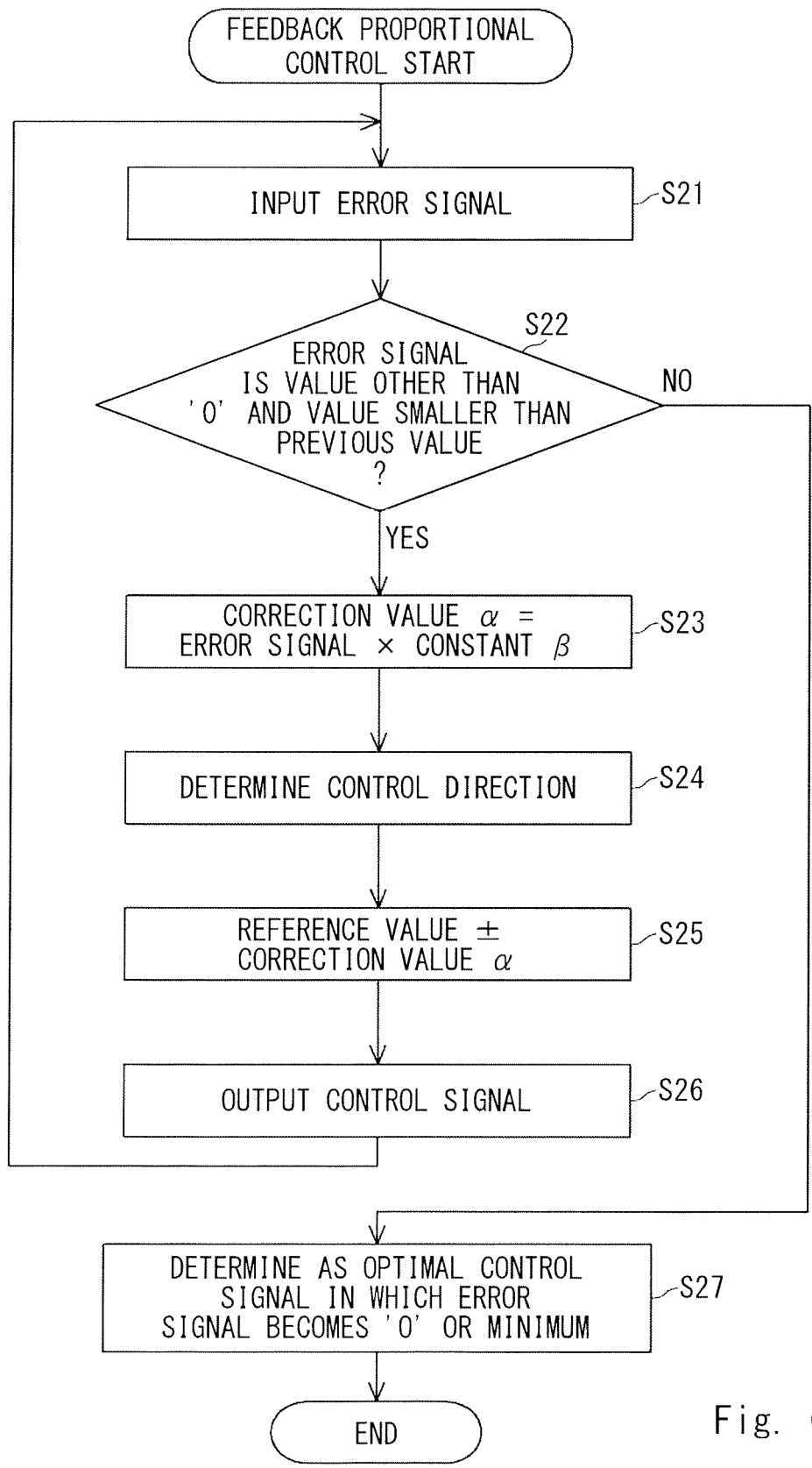
FIG. 6 is a flowchart showing one example of detailed operations regarding the feedback proportional control shown in Step S3 in the flowchart in FIG. 3.

Next, details of the operation of the feedback proportional control in Step S3 shown in the flowchart in FIG. 3 will be described with reference to FIG. 2 using the flowchart shown in FIG. 6. FIG. 6 is a flowchart showing one example of detailed operations regarding the feedback proportional control shown in Step S3 of the flowchart shown in FIG. 3, and shows a procedure of the operation of the feedback proportional control periodically executed for each predetermined cycle. That is, FIG. 6 describes each operation in which one or more loop operations are repeated before the optimal control signal in which the minimum error signal can be obtained is determined in the feedback proportional control started at the time of a predetermined cycle.

When the feedback proportional control is started and the error signal 26 is input to the second controller 22 shown in FIG. 2 from the first controller 21 in the flowchart shown in FIG. 6, the error signal 26 is detected by the error signal detection unit 221 (Step S21). At the time of the operation of the first feedback proportional control, the error signal 26 having the smallest value that corresponds to the control signal 27 set as the "reference value" in the operation of the "preliminary search" in FIG. 4 ('55 mV', which is the error signal $Y_4$, in the case of the example of the storage shown in Table 2) is input. Further, at the time of the operation of the feedback proportional control in the second and subsequent loops, the error signal 26 with respect to the control signal 27 that the control signal generator 224 has determined as the optimal control signal in the feedback proportional control executed in the previous cycle is input.

Next, the error signal detection unit 221 checks whether the input error signal 26 is a value other than '0' and has been decreased to a value smaller than the previous error signal 26 (Step S22). When the input error signal 26 is other than '0' and has been decreased to a value smaller than the previous error signal 26 (YES in Step S22), the process proceeds to Step S23. On the other hand, when the error signal 26 is '0' or has been increased to a value equal to or larger than the previous error signal 26 (NO in Step S22), it is determined that the optimal control signal in which the minimum value of the error signal in the feedback proportional control in the present cycle can be obtained has been detected, and then the process proceeds to Step S27.

In the first loop operation in the present cycle, the previous error signal 26 has not been obtained. Therefore, it is checked in Step S22 whether or not the input error signal 26 is '0'. Further, regarding the determination condition in Step S22, in order to prevent the feedback proportional control from continuing endlessly since it is impossible to detect a state where the error signal 26 has become '0' or has been increased to a value equal to or larger than the previous error signal 26, when the input error signal is a value other than '0' and has been decreased to a value smaller than the previous error signal 26 (YES in Step S22), the following determination condition may further be added before the process directly moves to Step S23, although it is not shown in the flowchart in FIG. 6.

For example, it is determined whether the input error signal 26 is present in "the range where it is expected to obtain the minimum value of the error signal". When the input error signal 26 is present in the above range, the process proceeds to Step S23. On the other hand, when the input error signal 26 has exceeded "the range where it is expected to obtain the minimum value of the error signal", the operation of the feedback proportional control is cancelled. In this case, the minimum error signal may be extracted from among the error signals previously collected in the feedback proportional control in the present cycle, assuming that the operation of collecting all the error signals in the feedback proportional control in the present cycle has been completed, and then the process may proceed to Step S27.

Furthermore, as described above in the description of the "preliminary search", it is possible to prevent the feedback proportional control from continuing endlessly using the "search range" in which the results of the "preliminary search" are reflected instead of using "the range where it is expected to obtain the minimum value of the error signal", which is the range assumed in advance. Further, this determination condition is effective also when the change in the error signals sequentially detected in the feedback proportional control is not limited to a simple decrease or a simple increase that changes in only one direction (that is, when the error signals obtained with respect to the setting values of the control signals that are sequentially changed in the repeat loop of the feedback proportional control are vertically oscillated). That is, when the error signals are oscillated in the feedback proportional control, a determination regarding whether the input error signal "has exceeded the range where it is expected to obtain the minimum value of the error signal" or whether the input error signal "has exceeded the search range" may be performed in place of the determination regarding whether the input error signal has "a value smaller than the previous value" in the determination condition in Step S22.

Further, regarding the determination condition in Step S22, the following measures may be taken in case that the input error signals 26 are oscillated, not simply decreased. That is, in units of grouping the error signals 26 into a predetermined number, it may be determined whether or not there is a change point from a decrease to an increase. When the change point of the error signals 26 in the grouped units has been detected, the operation of the feedback proportional control may be canceled and it can be regarded that the operation of collecting all the error signals in the feedback proportional control in the present cycle has been completed.

Next, the flowchart shown in FIG. 6 will be described once again. In Step S23, the multiplier 222 shown in FIG. 2 multiplies the input error signal 26 by the constant β that has been determined in advance at the time of adjustment of the shipment as the numerical value for adjusting the control sensitivity (control step) to generate the correction value α (Step S23). By the adjustment by the multiplication of the constant β, the control time, the control stability, and the control accuracy of the optical modulator 12 are determined. That is, as the error signal 26 becomes smaller toward the minimum value, in a width in accordance with the setting value of the constant β, the intervals of the step at which the control signal 27 is changed become narrow, whereby it is possible to obtain an optimal control signal with higher stability and higher accuracy.

After that, the control direction determination unit 223 determines the control direction regarding whether to add or subtract the correction value α to or from the reference value (Step S24). Here, the control direction determination unit 223 determines the control direction in such a way that the error signal approaches '0' based on the sample evaluation result executed in advance.

Last, in the control signal generator 224, the correction value α generated by the multiplier 222 is added or subtracted to or from the reference value in the direction determined by the control direction determination unit 223, thereby generating a new reference value (Step S25). Regarding the new reference value, in the feedback proportional control executed first time, a new reference value is generated using the "reference value" set in the "preliminary search", whereas in the second and subsequent time, a new reference value is generated using the "reference value" generated in the previous control signal generator 224. That is, the value, which is used as the reference value, is sequentially updated for each loop of the feedback proportional control. Then the control signal 27 that corresponds to the generated new reference value is output to the optical modulator 12 (Step S26).

After that, the process returns to Step S21, and the operation of collecting the error signal 26 with respect to the control signal 27 that has been newly generated is repeated. Further, in order to quickly respond to the fluctuation in the bias due to a change in the temperature or deterioration over time, the start intervals of the feedback proportional control in FIG. 6 periodically started for each predetermined cycle are set to short time intervals.

Further, when it is determined in Step S22 that the error signal 26 is '0' or has been increased to a value equal to or larger than the previous error signal 26 (NO in Step S22), as described above, it is determined that the optimal control signal in which the minimum value of the error signal in the feedback proportional control in the present cycle can be obtained has been detected, and the process proceeds to Step S27. Therefore, in Step S27, when the error signal 26 is '0', the control signal 27 in which the error signal 26 this time has been obtained is determined to be the optimal control signal in which the error signal in the feedback proportional control in the present cycle is minimized. On the other hand, when the error signal 26 has been increased to a value equal to or larger than the previous error signal 26, the control signal 27 where the previous error signal 26 has been obtained is determined to be the optimal control signal in which the error signal in the feedback proportional control in the present cycle is minimized.

When the condition for determining whether the input error signal 26 is present within "the range where it is expected to obtain the minimum value of the error signal" is added as the determination condition in Step S22, as described above, if the error signal 26 has not fallen within "the range where it is expected to obtain the minimum value of the error signal" as the result of the determination, the result of extracting the minimum error signal from among the error signals previously collected in the feedback proportional control in the present cycle is obtained in Step S27. Therefore, in this case, in Step S27, the control signal 27 that corresponds to the extracted minimum error signal is determined to be the optimal control signal in which the error signal in the feedback proportional control in the present cycle is minimized.

After that, the determined optimal control signal is output to the optical modulator 12 as the control signal 27, and is stored in the storage medium 16 as a "reference value" indicating the control signal that should be used first at the time of starting the feedback proportional control in the next cycle (Step S27).

Figure 7:
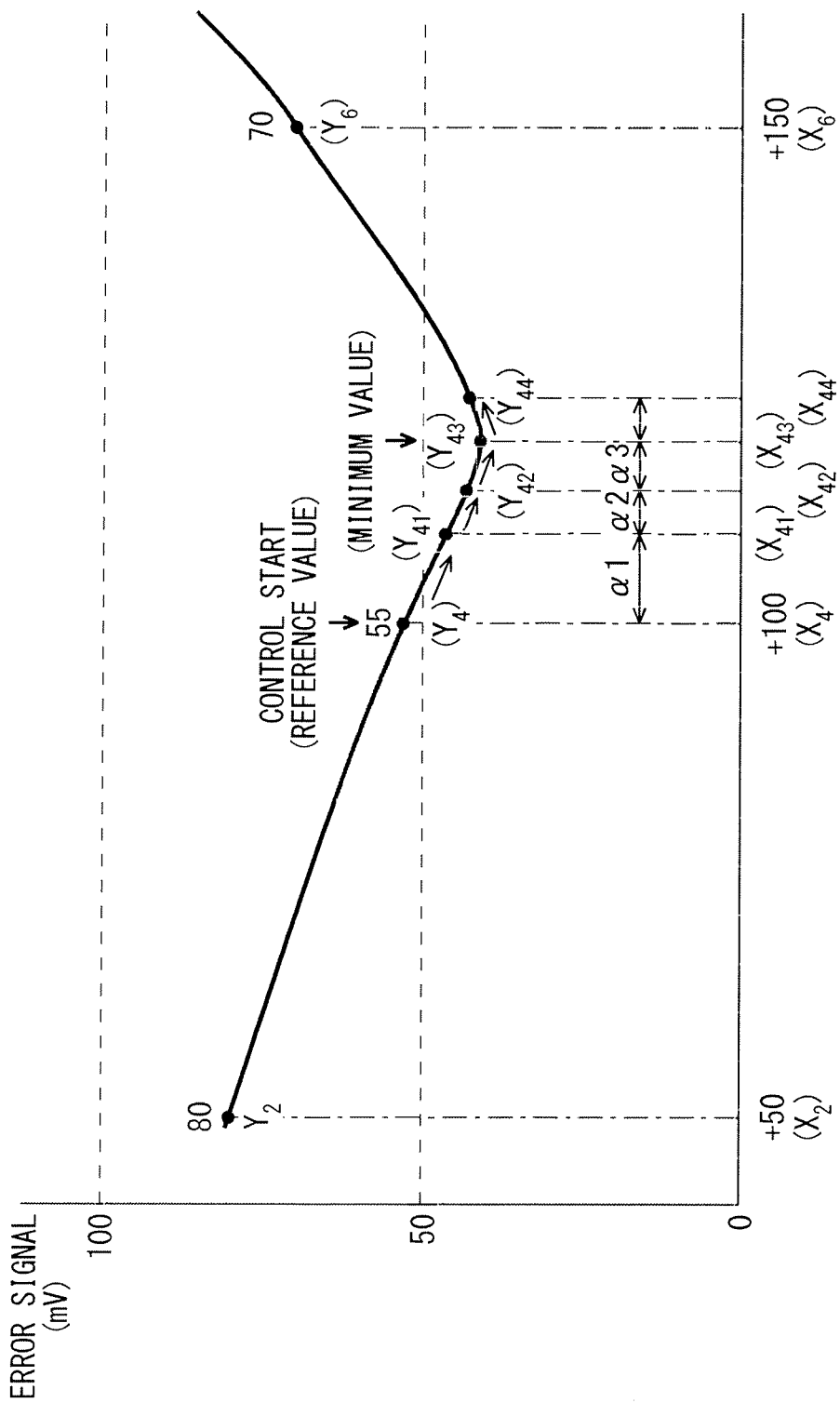
FIG. 7 is an explanatory diagram for describing one example of an order of setting the control signals in the feedback proportional control shown in the flowchart in FIG. 6.
Figure 8:
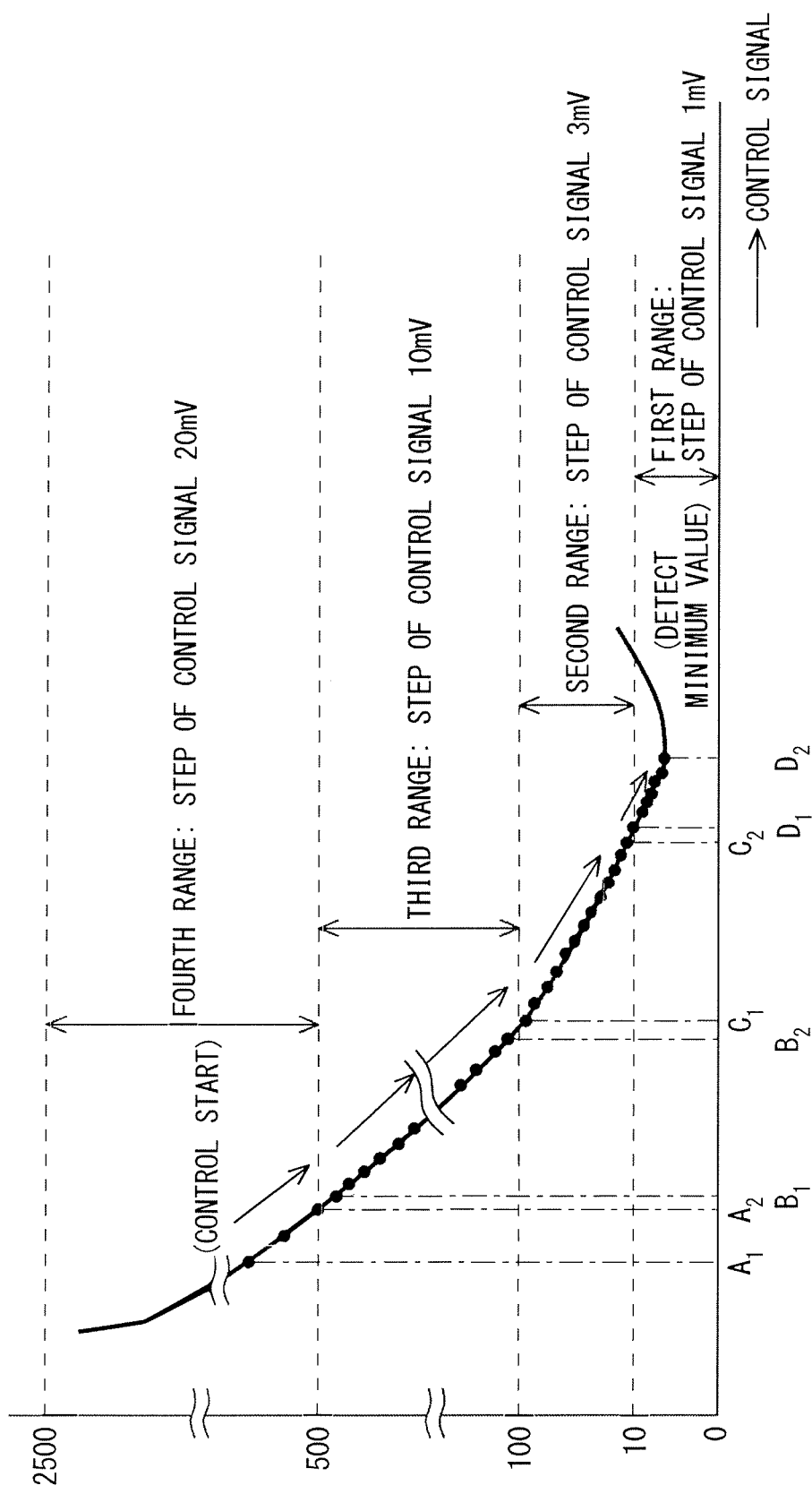
FIG. 8 is an explanatory diagram for describing an operation of setting the control signals according to the current technique.

FIG. 7 is an explanatory diagram for describing one example of the order of setting the control signals in the feedback proportional control shown in the flowchart in FIG. 6, and describes the order to setting the control signals in the first feedback proportional control executed following the "preliminary search" as an example. As shown in FIG. 7, this example shows a case in which error signals are simply decreased or increased without being oscillated with respect to the setting values of the control signals that are changed in the repeat loop of the feedback proportional control. Therefore, FIG. 7 shows, as shown in the flowchart in FIG. 6, a case in which the repetitive operation in the feedback proportional control is stopped, determining that the optimal control signal in which the minimum value of the error signal can be obtained has been detected at a timing when a value that is equal to or larger than the previous error signal has been detected in the repeat loop of the feedback proportional control.

In FIG. 7, when the first feedback proportional control is executed, the following operation is performed. First, as shown in FIG. 5, the control signal $X_4$ (=+100 mV) in which the error signal $Y_4$ (=55 mV) having the smallest value has been obtained in the coarse search operation of the "preliminary search" is set as the first control signal 27, and the error signal $Y_4$ is re-checked. After that, after the first correction value $\alpha_1$ is calculated by multiplying the obtained error signal $Y_4$ by the predetermined constant β, the correction value $\alpha_1$ is added to the control signal $X_4$, which is the initial reference value, to generate the next control signal $X_{41}$ and obtain the next error signal $Y_{41}$ in such a way that the value of the error signal becomes smaller.

As shown in FIG. 7, since the error signal $Y_{41}$ obtained for the control signal $X_{41}$ is a value smaller than the previous error signal $Y_4$, it is determined that the minimum value of the error signal has not yet been obtained and the feedback proportional control is continued. Therefore, after the next correction value $\alpha_2$ is calculated by multiplying the obtained error signal $Y_{41}$ by the predetermined constant β, the correction value $\alpha_2$ is added to the previous control signal $X_{41}$ to further generate the next control signal $X_{42}$ and further obtain the next error signal $Y_{42}$ in such a way that the value of the error signal becomes smaller. The current correction value $\alpha_2$ is a value smaller than the previous correction value $\alpha_1$ since the error signal $Y_{41}$ multiplied by the constant is a value smaller than the previous error signal $Y_4$. Therefore, the width of the step of the control signal $X_{42}$ from the previous control signal $X_{41}$ is narrowed, and the point of the minimum value of the error signal can be specified more finely.

Since the error signal $Y_{42}$ obtained for the control signal $X_{42}$ is a value smaller than the previous error signal $Y_{41}$, it is determined that the minimum value of the error signal has not yet been obtained and a similar feedback proportional control is repeated to generate the next control signal $X_{43}$ and obtain the error signal $Y_{43}$. The current correction value $\alpha_3$ that has been calculated is further smaller than the previous correction value $\alpha_2$ and the width of the step of the control signal $X_{43}$ from the previous control signal is further narrowed.

Since the error signal $Y_{43}$ obtained for the control signal $X_{43}$ is also a value smaller than the previous error signal $Y_{42}$, it is determined that the minimum value of the error signal has not yet been obtained and a similar feedback proportional control is repeated. That is, the operation is continued so that the width of the step is gradually narrowed in accordance with the decrease in the error signal to allow the control signals to converge to the value of the optimal control signal.

As shown in FIG. 7, when the error signal $Y_{44}$ obtained for the next control signal $X_{44}$ becomes a value equal to or larger than the previous error signal $Y_{43}$ as a result of repeating the aforementioned calibration operation, it can be determined that the previous control signal $X_{43}$ is the optimal control signal in which the minimum error signal $Y_{43}$ can be obtained.

Accordingly, the optical modulator 12 is to be controlled by setting the control signal $X_{43}$ that corresponds to the error signal $Y_{43}$ having the smallest value obtained last time as the optimal control signal, and the control signal $X_{43}$ is set as the reference value of the feedback proportional control in the next cycle. Then the operation of the feedback proportional control in the present cycle is ended.

As described above, as the feedback proportional control periodically started for each predetermined cycle, the reference value in the "preliminary search" or the feedback proportional control in the previous cycle is set as the first control signal at the time of starting the present cycle, and the operation starts from different control signals every time so as to obtain the control signal having a neighboring value in which it can be assumed that the minimum value of the error signal or the value '0' can be obtained in the present cycle, whereby it is possible to reduce the time of controlling the optical modulator 12.

Description of Effects of Example Embodiment

As described above in detail, in this example embodiment, the following effects can be obtained.

That is, the operation executed only the first time is separated as the "preliminary search" and the first control signal in each feedback proportional control periodically executed can be started from a neighboring value in which the minimum value of the error signal can be obtained at that time, whereby it is possible to reduce the time of controlling the optical modulator 12 and the time of starting up the optical transceiver device 10 on which the optical modulator 12 is mounted. Further, in each feedback proportional control, fine control signals are generated using the correction values a calculated based on the error signals, not by predetermined constant step sizes, whereby it is possible to control the optical modulator 12 with a high accuracy, improve the signal quality, and achieve multi-level modulation such as 64 QAM.

The configurations of the preferable example embodiment of the present disclosure have been described. It should be noted, however, that this example embodiment is merely an example of the present disclosure and do not limit the present disclosure. One skilled in the art would easily understand that various modification and changes may be made to the present disclosure in accordance with the specific application without departing from the spirit of the present disclosure.

While the present disclosure has been described as a hardware configuration in the aforementioned embodiments, the present disclosure is not limited thereto. The present disclosure may achieve desired processing by causing a Central Processing Unit (CPU) to execute a computer program. Further, the aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

This application is based upon and claims the benefit of priority from Japanese Patent Application No. 2018-066640, filed on Mar. 30, 2018, the disclosure of which is incorporated herein in its entirety by reference.

REFERENCE SIGNS LIST

10 Optical Transceiver Device
11 Light Source
12 Optical Modulator
13 Receiver
14 DSP
15 Controller
16 Storage Medium
21 First Controller
22 Second Controller
25 Modulated Optical Signal
26 Error Signal
27 Control Signal
121 Feedback Proportional Control
211 Control Circuit Unit
212 Error Signal Generator
221 Error Signal Detection Unit
222 Multiplier
223 Control Direction Determination Unit
224 Control Signal Generator

The invention claimed is:
1. An optical transceiver device comprising:
an optical modulator that is configured to modulate a continuous light from a light source, control a bias voltage of the optical modulator by a control signal, and periodically update the control signal at predetermined cycles;

at least one processor; and at least one memory coupled to the at least one processor, the memory storing instructions that, when executed by the at least one processor, cause the at least one processor to:

set the control signal at two stages including a preliminary search executed only at a time of an initial startup and a feedback proportional control periodically executed for each cycle of the predetermined cycles;

set, in the preliminary search, the control signal used at a time of starting the feedback proportional control subsequently executed as a reference value; and repeat, in the feedback proportional control, the following processing of starting control of the optical modulator by setting the control signal to the reference value set in the preliminary search or a reference value stored in the feedback proportional control in a previous cycle, calculating a new reference value based on an error signal obtained from the optical modulator as a result of controlling the optical modulator, and controlling the optical modulator by setting the control signal to the calculated new reference value, thereby acquiring the control signal in which the error signal is minimized as an optimal control signal and setting the optimal control signal as the control signal for controlling the optical modulator, and storing the set optimal control signal as a reference value to be used at a time of starting the feedback proportional control in a next cycle, wherein in the preliminary search, a predetermined number of control signals are selected in a predetermined range in which it is assumed that the error signal may be minimized, the optical modulator is controlled using each of the predetermined number of control signals, and one of the predetermined number of control signals that minimizes the error signal is set as the reference value, and in the feedback proportional control, a search range for a minimum value of the error signal is set and centered about the reference value set in the preliminary search.

2. The optical transceiver device according to claim 1, wherein the new reference value is generated based on the error signal in the feedback proportional control, and a correction value is calculated by multiplying the error signal obtained as a result of the control by the control signal by a predetermined constant, and the reference value that corresponds to the control signal in a present cycle is further corrected by the calculated correction value, thereby generating the new reference value.

3. The optical transceiver device according to claim 2, wherein the reference value that corresponds to the control signal in the present cycle is corrected by the correction value in the feedback proportional control, and the correction value is added to or subtracted from the reference value that corresponds to the control signal in the present cycle in such a way that the error signal obtained using the control signal of the new reference value decreases toward '0'.

4. The optical transceiver device according to claim 1, wherein the control signal in which the error signal is minimized is acquired as the optimal control signal by detecting, in the feedback proportional control, whether the error signal obtained using the control signal of the new reference value has become '0' or has become a value larger than the error signal obtained last time.

5. An optical modulator control method comprising:

controlling a bias voltage of an optical modulator that is configured to modulate a continuous light from a light source by a control signal and periodically updating the control signal at predetermined cycles;

setting the control signal at two stages including a preliminary search executed only at a time of an initial startup and a feedback proportional control periodically executed for each cycle of the predetermined cycles;

setting the control signal used at a time of starting the feedback proportional control subsequently executed as a reference value in the preliminary search;

repeating, in the feedback proportional control, the following processing of starting control of the optical modulator by setting the control signal to the reference value set in the preliminary search or a reference value stored in the feedback proportional control in a previous cycle, calculating a new reference value based on an error signal obtained from the optical modulator as a result of controlling the optical modulator, and controlling the optical modulator by setting the control signal to the calculated new reference value, thereby acquiring the control signal in which the error signal is minimized as an optimal control signal and setting the optimal control signal as the control signal for controlling the optical modulator, and storing the set optimal control signal as a reference value to be used at a time of starting the feedback proportional control in a next cycle, and selecting, in the preliminary search, a predetermined number of control signals in a predetermined range in which it is assumed that the error signal may be minimized, controlling the optical modulator using each of the predetermined number of control signals, and setting one of the predetermined number of control signals that minimizes the error signal as the reference value, wherein in the feedback proportional control, a search range for a minimum value of the error signal is set and centered about the reference value set in the preliminary search.

6. The optical modulator control method according to claim 5, wherein the new reference value is generated based on the error signal in the feedback proportional control, a correction value is calculated by multiplying the error signal obtained as a result of the control by the control signal by a predetermined constant, and the reference value that corresponds to the control signal in a present cycle is further corrected by the calculated correction value, thereby generating the new reference value.

7. The optical modulator control method according to claim 6, comprising:

correcting the reference value that corresponds to the control signal in the present cycle by the correction value in the feedback proportional control; and adding or subtracting the correction value to or from the reference value that corresponds to the control signal in the present cycle in such a way that the error signal obtained using the control signal of the new reference value decreases toward '0'.

8. A non-transitory computer readable medium storing an optical modulator control program, that, when executed by a computer, cause the computer to: control a bias voltage of an optical modulator that is configured to modulate a continuous light from a light source by a control signal and periodically update the control signal at predetermined cycles; set the control signal at two stages including a preliminary search executed only at a time of an initial startup and a feedback proportional control periodically executed for each cycle of the predetermined cycles; set the control signal used at a time of the feedback proportional control subsequently executed as a reference value in the preliminary search; repeat, in the feedback proportional control, the following processing of starting control of the optical modulator by setting the control signal to the reference value set in the preliminary search or a reference value stored in the feedback proportional control in a previous cycle, calculating a new reference value based on an error signal obtained from the optical modulator as a result of controlling the optical modulator, and controlling the optical modulator by setting the control signal to the calculated new reference value, thereby acquiring the control signal in which the error signal is minimized as an optimal control signal and setting the optimal control signal as the control signal for controlling the optical modulator, and storing the set optimal control signal as a reference value to be used at a time of starting the feedback proportional control in a next cycle, and select, in the preliminary search, a predetermined number of control signals in a predetermined range in which it is assumed that the error signal may be minimized, control the optical modulator using each of the predetermined number of control signals, and set one of the predetermined number of control signals that minimizes the error signal as the reference value, wherein in the feedback proportional control, a search range for a minimum value of the error signal is set and centered about the reference value set in the preliminary search.

* * * * *